United States Patent
Yamada

[19]
[11] Patent Number: 6,009,804
[45] Date of Patent: Jan. 4, 2000

[54] PRINTING DEVICE WITH SORTER HAVING A PLURALITY OF BINS

[75] Inventor: Masami Yamada, Osaka, Japan

[73] Assignee: Minolta Co., Ltd., Osaka, Japan

[21] Appl. No.: 09/190,421

[22] Filed: Nov. 12, 1998

[30] Foreign Application Priority Data

Nov. 21, 1997 [JP] Japan ................................. 9-230673

[51] Int. Cl.[7] ........................................... B41F 6/14
[52] U.S. Cl. .............................. 101/2; 271/298; 271/290
[58] Field of Search ........................... 101/2; 271/298, 271/290, 287, 288; 270/52.03

[56] References Cited

U.S. PATENT DOCUMENTS

| | | | |
|---|---|---|---|
| 5,106,076 | 4/1992 | Fujita et al. | 271/287 |
| 5,328,169 | 7/1994 | Mandel | 271/290 |
| 5,342,034 | 8/1994 | Mandel et al. | 270/53 |
| 5,358,238 | 10/1994 | Mandel et al. | 271/298 |
| 5,435,544 | 7/1995 | Mandel | 271/298 |
| 5,551,686 | 9/1996 | Sanchez et al. | 271/287 |
| 5,777,882 | 7/1998 | Salgado | 364/478.02 |

FOREIGN PATENT DOCUMENTS 8-002790  9/1996  Japan.

*Primary Examiner*—Edgar Burr
*Assistant Examiner*—Minh H. Chau
*Attorney, Agent, or Firm*—Sidley & Austin

[57] ABSTRACT

A printing device with a sorter is provided having a plurality of bins, capable of enhancing the practicality of a configuration where a plurality of bins are used for both a mail printing and a sort printing. According to the printing device, when, in a sort printing which is instructed by a certain user, it is required to use bins which are allocated to other users for the sake of a mail printing, an inquiry whether the bins are available or not is issued of the other users in advance to the sort printing. Only when the use of the bins is not refused, are the bins selected as discharge destinations.

14 Claims, 6 Drawing Sheets

PRINTING DEVICE WITH SORTER HAVING A PLURALITY OF BINS

CROSS-REFERENCE TO RELATED APPLICATIONS

This application is based on application No.9-320673 filed in Japan, the contents of which are hereby incorporated by reference.

BACKGROUND OF THE INVENTION

1. Field of the Invention

The present invention relates to a printing device with a sorter having a plurality of bins, and is particularly preferable in a printing system in which a plurality of hosts share the printing device.

2. Description of the Related Art

One of the additional mechanisms for printing devices such as a printer, a copier, and a facsimile device is a sorter. The use of a sorter eliminates the need for sorting sheets by the operator in a printing of plural sets. Hereinafter, a printing using such a sorter is referred to as "a sort printing." A usual sorter has about 10 to 40 bins.

On the other hand, in an OA network wherein a plurality of computers share one printing device, a use mode is known in which bins of a sorter are used as discharge trays dedicated to specific receivers, respectively. For example, the bins are allocated to the computers (print request sources) which send image data. In this case, the operator which has instructed a printing through one of the computers is requested only to recover printed sheets (printed articles) which are discharged to the bin allocated to the computer. Alternatively, the bins may be used as mail boxes and allocated to distribution addresses (destinations) of printed articles. In the alternative, in place of the operator which has instructed the printing, a person at each distribution address recovers printed articles from the allocated bin. In both cases, in a printing in which printed sheets are discharged to preallocated bins (hereinafter, referred to as "a mail printing"), the computer gives print job data including any kind of information designating the discharge bin, to the printing device.

When a sorter is used not only in a mail printing as described above but also in a sort printing, the printing environment is further convenient.

In the case where the number of sorted sets is equal to or larger than the number of bins, however, bins which are allocated to specific receivers for the sake of a mail printing are inevitably used. When a certain user instructs a mail printing without knowing that the bin allocated to the user is used in a sort printing which is instructed by another user, printed articles of the sort printing and those of the mail printing are mixed with each other. This causes a fear that the printed articles are erroneously recovered. When the use of such bins is subsequently notified as disclosed in Japanese patent publication No. HEI18-2790, it is possible to prevent the printed articles from being erroneously recovered. However, there arises a problem in that the user which intends to perform a mail printing must wait until the printed articles of the sort printing are recovered.

SUMMARY OF THE INVENTION

It is an object of the invention to provide an improved printing device which can solve the above-discussed problems.

It is another object of the invention to, in a printing device with a sorter having a plurality of bins, realize a sort printing which does not disturb a use of the printing device as mail printing means, and enhance the practicality of a configuration where a plurality of bins are used for both a mail printing and a sort printing.

The objects can be attained by providing a printing device connected with a plurality of external devices, and for, on the basis of print job data transmitted from the external devices, performing a mail printing in which printed sheets are discharged to designated specific bins, and a sort printing in which printed sheets are sorted and discharged to a plurality of bins, comprising:

a plurality of bins to which printed sheets are discharged, a part of the plural bins being allocated as mail bins for the mail printing to specific ones of the plural external devices; and a controller which, when the sort printing is to be performed, inquires of the specific external devices to which the mail bins are allocated whether the mail bins are available or not, and which, on the basis of a reply to the inquiry, selects bins that are to be used in the sort printing.

The printing device may be configured so that the printing device further comprises a sensor which detects the existence or nonexistence of a sheet in each of the plural bins, and the controller detects, on the basis of a detection result of the sensor, bins of the plural bins to which a sheet is not discharged, and, when the number of bins which are not the mail bins and to which a sheet is not discharged is smaller than the number of sorted sets which is set in the sort printing, inquires whether the mail bins are available or not.

The controller may notify an external device which requests the sort printing which of the bins have been used in a sort printing. When there exists a sheet in a bin used in the sort printing at a timing when a given time period elapses after an end of the sort printing, the controller may notify an external device which requests the sort printing and external devices to which the mail bins used in the sort printing are allocated.

Furthermore, the objects can be attained by providing a printing device connected with a plurality of external devices, and for, on the basis of print job data transmitted from the external devices, performing a mail printing in which printed sheets are discharged to designated specific bins, and a sort printing in which printed sheets are sorted and discharged to a plurality of bins, comprising:

a plurality of bins to which printed sheets are discharged, a part of the plural bins being allocated as mail bins for the mail printing to specific ones of the plurality of external devices; and a controller which, when the sort printing is to be performed, judges whether the mail bins are required to be used in the sort printing or not, which, when the mail bins are required to be used, inquires of the specific external devices to which the mail bins are allocated whether the mail bins are available or not, and which, when a negative reply to the inquiry is not received within a given time period, selects the mail bins as bins that are to be used in the sort printing.

The printing device may be configured so that the printing device further comprises a sensor which detects the existence or nonexistence of a sheet in each of the plural bins, and the controller detects, on the basis of a detection result of the sensor, bins of the plural bins to which a sheet is not discharged, and, when the number of bins which are not the mail bins and to which a sheet is not discharged is smaller than the number of sorted sets which is set in the sort printing, judges that the mail bins are necessary to be used in the sort printing.

The controller may judge whether the sort printing can be performed or not, on the basis of the number of bins which is a sum of the number of bins which are not the mail bins and to which a sheet is not discharged and the number of the mail bins that are selected as the bins to be used in the sort printing.

In the invention, when, in a sort printing which is instructed by a certain user, it is required to use bins which are allocated to other users for the sake of a mail printing, an inquiry whether the bins are available or not is issued to the other users in advance of the sort printing. Only when the use of the bins is not refused, are the bins selected as discharge destinations. Bins which are the objects of the inquiry are restricted to ones which are undefined whether they are available or not, and do not include bins which are locked, or which are permanently inhibited from being used in a sort printing.

A sensor is disposed in each of the bins to detect the existence or nonexistence of a sheet. In a sort printing, only bins in which no sheet remains or which is in the empty state are used. This prevents printed articles from being erroneously recovered. The user which is the print request source is notified of the bins which have been used in the sorting, thereby providing convenience for recovery. Furthermore, a delay of recovery of printed articles which are discharged as a result of a sort printing is warned so as to enhance the utilization ratio.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Hereinafter, a preferred embodiment of the invention will be described with reference to the accompanying drawings.

Figure 1:
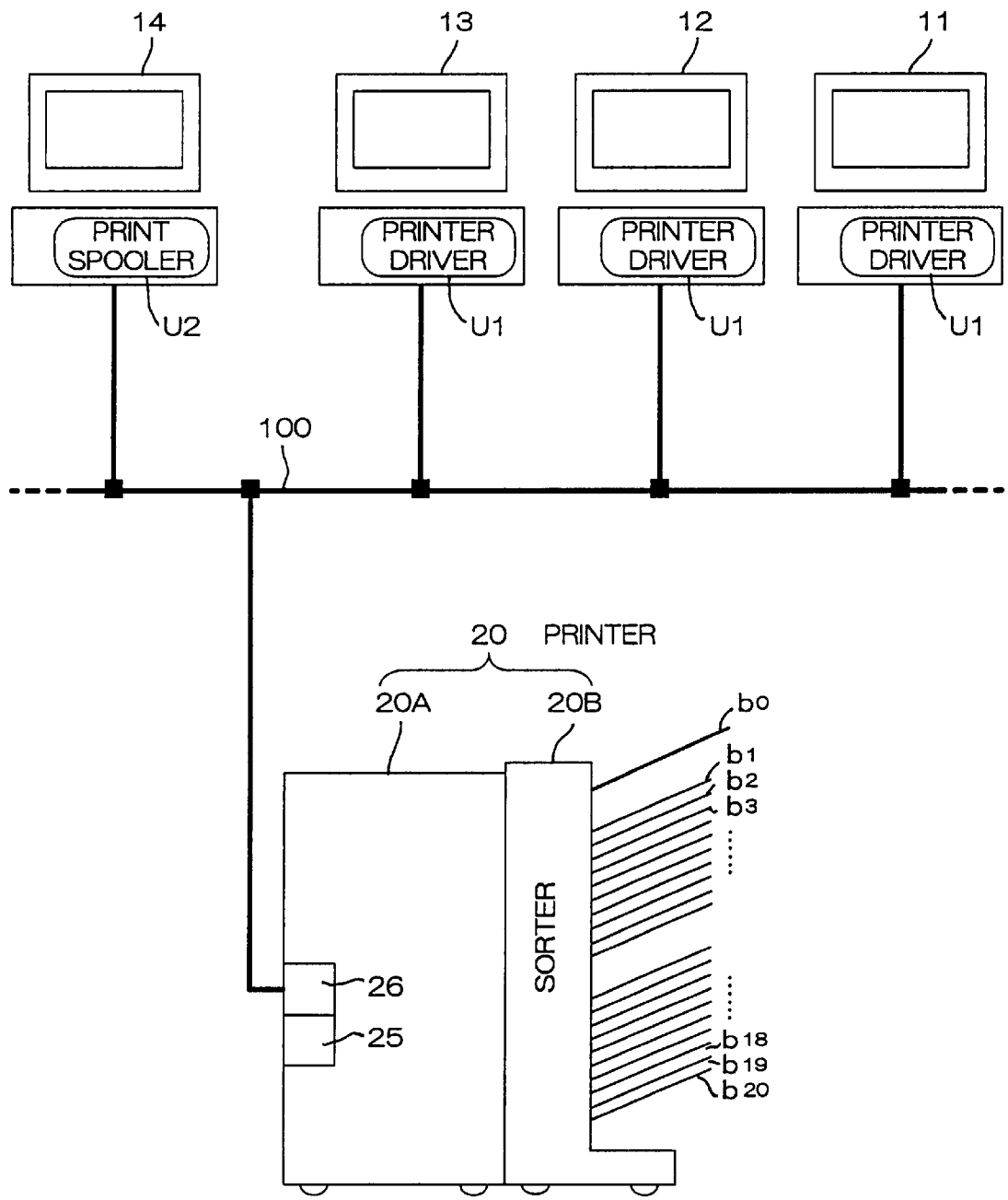
FIG. 1 is a diagram showing the configuration of a printing system which is an embodiment of the invention.

FIG. 1 is a diagram showing the configuration of a printing system 1 to which the invention is applied.

The printing system 1 constitutes a part of a LAN in which a plurality of data processing devices including computers 11 to 14 are connected by a cable 100 so as to communicate with one another. The printing system 1 comprises a printer 20 serving as a printing device. The printer 20 is connected to the cable 100 via a network interface card (NIC) 26. In the printing system 1, one of the computers or the computer 14 functions as a print server. The printer 20 has a port 25 for parallel transmission, serial transmission, infrared communication, etc. A network system may be employed in which the printer 20 is connected to the computer 14 through the port 25 so that the printer 20 is connected to the cable 100 via the computer 14.

The printer 20 consists of a main unit 20A and a sorter 20B. An electrophotographic image forming mechanism having an automatic sheet supply function is incorporated in the main unit 20A. A sheet which has been subjected to a print process in the main unit 20A is sent to the sorter 20B and then discharged to a predetermined bin. The sorter 20B has twenty-one bins b0 to b20 which are vertically arranged. The bin b0 at the highest stage is a shared bin used in a normal printing which is not a mail printing or a sort printing. The twenty bins b1 to b20 other than the highest stage are disposed as discharge destinations which are used for both a mail printing and a sort printing. Some of the bins b1 to b20 are used as "mail bins" serving as discharge destinations in a mail printing, and are allocated to specific users (receivers of printed articles). The mail bins are registered in the printer 20. In the specification, the term "user" means a data processing device which outputs a print job data. In the embodiment, therefore, the users mean hosts such as the computers 11 to 13. In a modification of the bin configuration, a special bin such as the bin b0 is not disposed, and all the bins are set so as to be useful in a mail printing and a sort printing.

A printer driver U1 is installed in each of the computers 11 to 13 serving as hosts which share the printer 20. The printer driver U1 is software for outputting a print job data of a format suitable to the printer 20. A print spooler U2 which is software for centralized management of print jobs is installed in the computer 14 serving as a print server. The print job data output from the computers 11 to 13 are first stored in the computer 14 and then transferred to the printer 20 in the unit of adequate data amount in accordance with the progress of a printing process.

In the printing system 1, when a sort printing is to be done, the printer 20 performs an inquiry about the use of the mail bins which is a process unique to the invention. This inquiry is transmitted to the printer drivers U1 of the computers 11 to 13 via the print spooler U2. Each of the printer drivers U1 displays a message for the operator to reply whether the use is to be refused or not. If the operator issues instructions indicative of refusal, the printer driver U1 notifies the print spooler U2. If no instructions indicative of refusal is issued within a given time period, it is deemed that the use of the corresponding bin is allowed. Each user can previously register with the print server the setting that, with respect to the mail bin allocated to the user, the use of the mail bin by another user is always refused. As a result of this registration, the operator is not required to perform an operation of issuing instructions indicative of refusal for each inquiry from the printer 20. In accordance with the circumstances of the network, it is suitably selected whether the registration is set to be permanently effective, or it is automatically canceled after the elapse of a given time period (for example, 30 to 60 minutes), in consideration of convenience of sorting.

Figure 2:
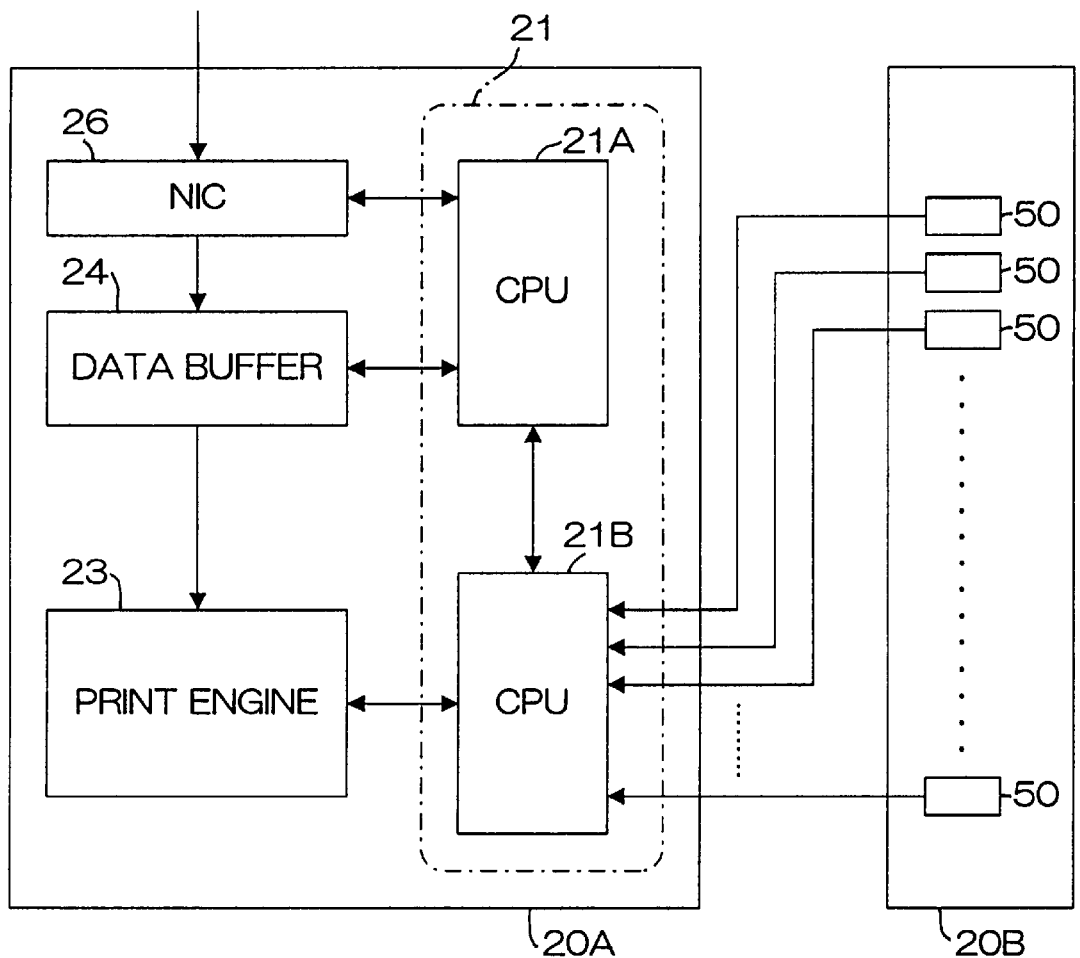
FIG. 2 is a functional block diagram of a printer of the embodiment.

FIG. 2 is a functional block diagram of the printer 20.

A control system 21 of the printer 20 has a CPU 21A which processes data, and another CPU 21B which controls a print engine 23. The CPU 21A controls the print job data supplied from the print server, to be temporarily stored into a data buffer 24, and analyzes commands of a page description language to expand a bit map. The print engine 23 reproduces an image on a sheet on the basis of bit map data. In this process, the CPU 21B controls the sheet supplying and discharging operations, based on information received from the CPU 21A and a detection signal from a sheet sensor 50 which is disposed in each of the bins of the sorter 20B.

The print job data consists of image information, bin designation information, sheet direction information, and other information. The bin designation information indicates whether discharge to a specific bin is required or not (i.e., whether the corresponding printing is a mail printing or not), and specifies mail bins which are to be used in a mail printing. The sheet direction information indicates the direction of an image with respect to a sheet, i.e., the contents of designation of portrait/location. The other information includes the sheet size, the number of print sets, and the requirement of sorting.

Figure 3:
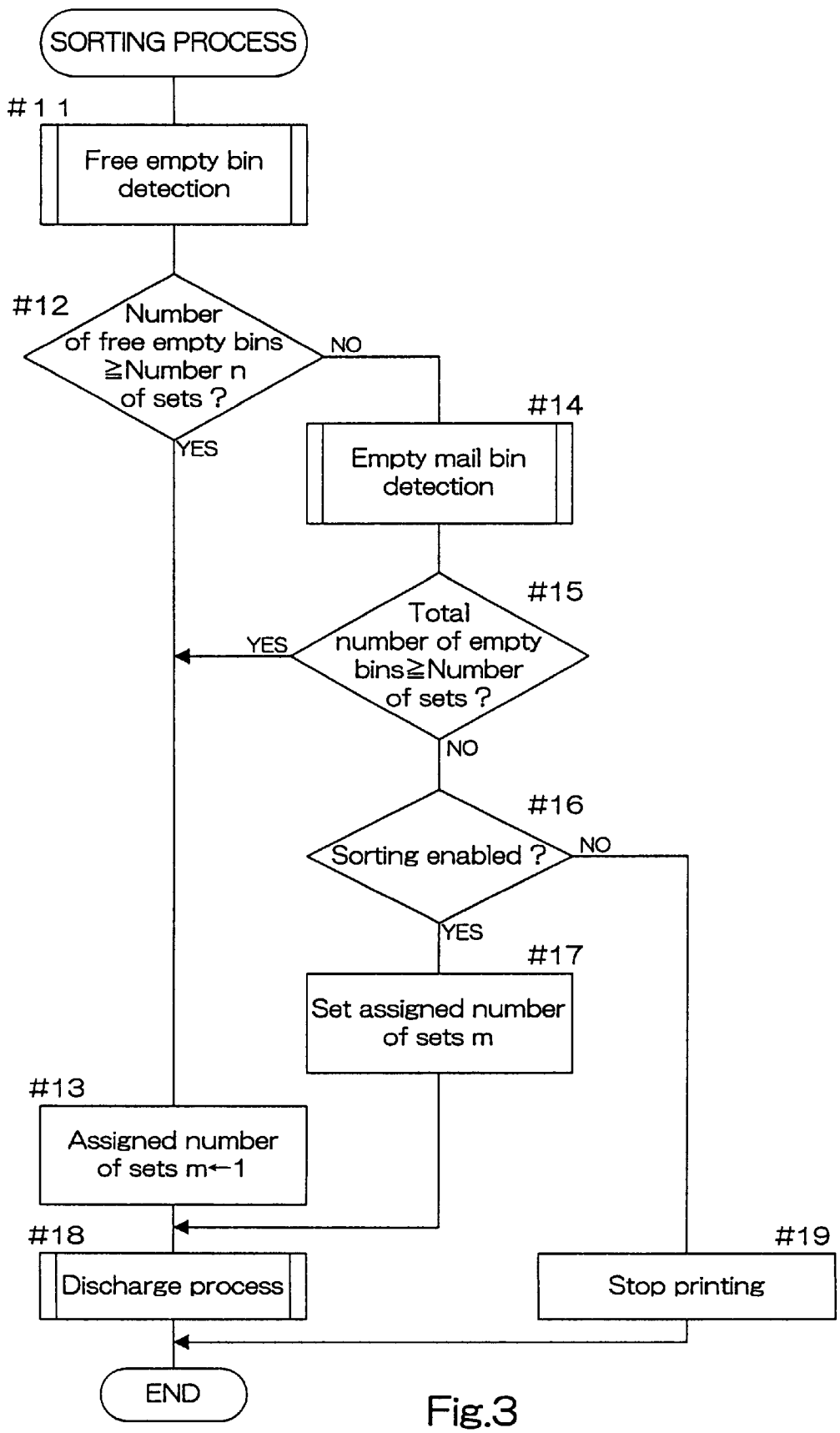
FIG. 3 is a flowchart of a sorting process which is executed by a control system of the printer of the embodiment.

FIG. 3 is a flowchart of a sorting process which is executed by the control system 21 of the printer 20. This routine is activated when a print job data requesting sorting is received.

First, a process of "detection of a free empty bin" is executed to search a bin which is one of the twenty bins b1 to b20 and allowed to be freely used as a sort bin (a free bin) and in which no sheet remains or which is in the empty state (#11). The judgment on whether a bin is in the empty state or not is performed on the basis of the detection signal from the above-mentioned sheet sensor 50. The term "free bin" means a bin (including a shared bin) other than mail bins, and a mail bin which is allocated to the user requesting the printing. If the number "a" of free empty bins is not smaller than the requested number "n" of sorted sets, an assigned number "m" of sets per bin is set to 1 (#12 and #13). In the case where, when the mail bin which is allocated to the user requesting the printing becomes empty, the number "a" of free empty bins reaches the requested number "n" of sorted sets, the recovery of a sheet may be requested to the user, and the assigned number "m" of sets may be set after the recovery is conducted.

By contrast, If the number "a" of free empty bins is smaller than the number "n" of sorted sets, i.e., if it is necessary to use mail bins allocated to other users, a process of "detection of an empty mail bin" is executed to detect empty mail bins or bins which are mail bins for another user and available (#14). Thereafter, a total number of empty bins (a +b) which is a sum of the number "a" of free empty bins and the number "b" of empty mail bins is compared with the number "n" of sorted sets (#15).

If the total number of empty bins is not smaller than the number "n" of sorted sets, the control proceeds to step #13 in which the assigned number "m" of sets is set to 1. If the total number of empty bins is smaller than the number "n" of sorted sets, it is then judged whether sorting can be performed or not (#16). From an idealistic view point, it is preferable to discharge one set to each bin. In the embodiment, however, a sorting mode in which plural sets are discharged to each bin is allowed in order to increase the maximum number of sorted sets. The number of sheets which can be accommodated in one bin is limited. When the maximum number "M" of sheets which can be accommodated is 50 and the number "p" of pages of an original is 10, for example, the number of sets which can be assigned to each bin is 5. A sorting process is enabled when a product of the number "p" of pages of an original and the number "n" of sorted sets is smaller than that of the total number of empty bins and the maximum number "M" of sheets per bin. Therefore, it is checked whether the condition [np≦(a+b)M] holds or not.

If a sorting process is enabled, an assigned number "m" of sets is set so that sheets are discharged to available empty bins as uniformly as possible (#17). Specifically, a value [n/(a+b)+1] obtained by discarding the fractional portion of a quotient of a division of the number of sorted sets by the total number of empty bins, and adding 1 to the rest is set as "m". When the total number of empty bins is 12 and the number of sorted sets is 20, for example, "m" is 2. In this case, two sets are discharged to each of 8 (=20–12) bins, and one set is discharged to each of the remaining 4 bins.

After the assigned number "m" of sets is set in step #13 or #17, a "discharge" process is executed to discharge sheets to the empty bins which are selected in accordance with the number of sorted sets, in the order of predetermined priority (for example, the order of the mail bin for the user of the print request source→the shared bin→free bins other than the shared bin→mail bins of other users) (#18).

If it is judged in the check of step #16 that sorting is disabled, the printing process is aborted (#19). This abortion is notified to the host and an abort message is displayed by the printer driver U1.

Figure 4:
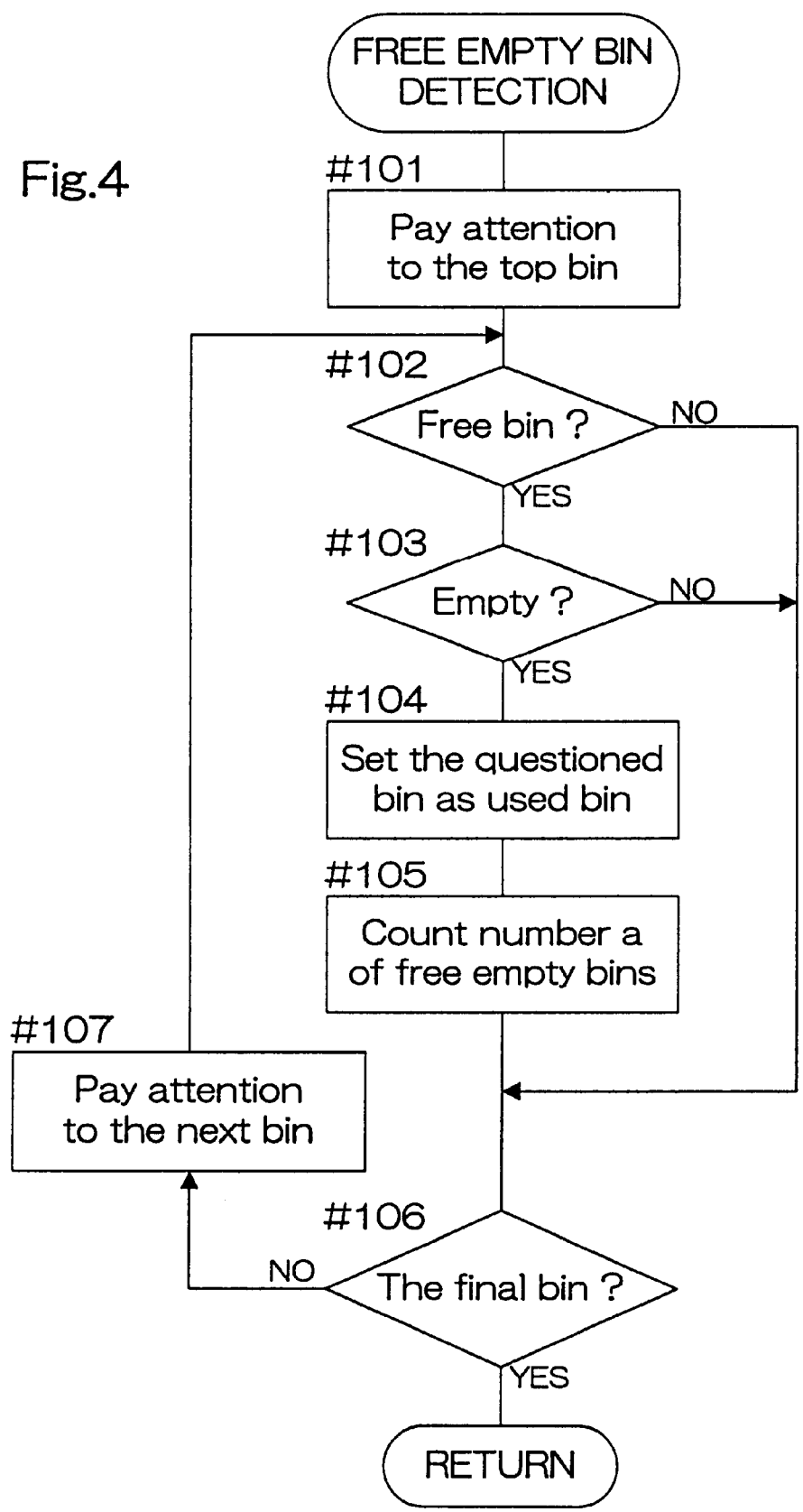
FIG. 4 is a flowchart of a subroutine of "detection of a free empty bin"

FIG. 4 is a flowchart of a subroutine of "detection of a free empty bin" which is executed in step #11 of FIG. 3.

First, in step #101, attention is paid to the top bin (b0) (in other words, the bin is recognized as a bin to be processed). It is checked whether the questioned bin is free and empty or not (#102 and #103). If the questioned bin is free and empty (YES in #102 and #103), the bin is set as a used bin serving as a bin to which a sheet is to be discharged, and the number "a" of free empty bins is incremented by one (#104 and #105). It is checked whether the currently questioned bin is the final bin (b20) or not (#106). If the bin is not the final bin (NO in #106), attention is paid to the next bin (#107), and the above-mentioned process (#102 to #105) is repeated. In this way, the bins b0 to b20 are subjected to the above-mentioned process, in the order starting from the top bin. If it is judged in step #106 that the currently questioned bin is the final bin (YES in #106), the subroutine is ended.

Figure 5:
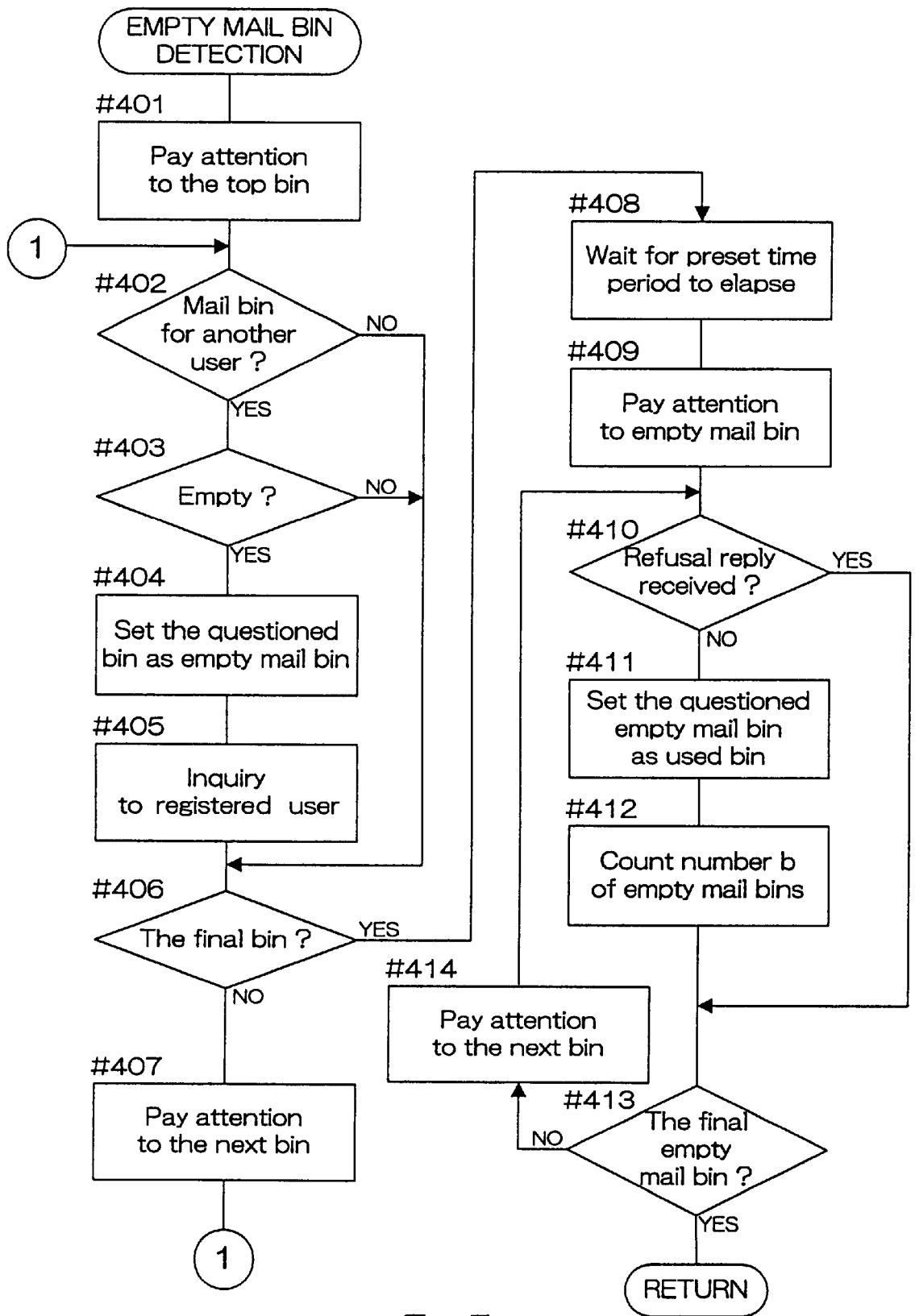
FIG. 5 is a flowchart of a subroutine of "detection of an empty mail bin"

FIG. 5 is a flowchart of a subroutine of "detection of an empty mail bin" which is executed in step #14 of FIG. 3.

First, instep #401, attention is paid to the top bin (b0). It is checked whether the questioned bin is a mail bin for another user and empty or not (#402 and #403). If the questioned bin is a mail bin for another user and empty (YES in #402 and #403), the bin is set as an empty mail bin, and an inquiry whether the bin is available or not is issued to the user to which the questioned bin is allocated (#404 and #405). It is checked whether the currently questioned bin is the final bin (b20) or not (#406). If the bin is not the final bin (NO in #406), attention is paid to the next bin (#407), and the above-mentioned process (#402 to #405) is repeated. In this way, the bins b0 to b20 are subjected to the above-mentioned process, in the order starting from the top bin. If all the bins have been subjected to the process (YES in #406), the control is transferred to a process subsequent to step #408.

First, the control waits until a preset time period (for example, 30 seconds) elapses (#408). The bins which are set as empty mail bins in step #404 are sequentially subjected to a process in which results of the inquiries performed in step #405 are checked, a bin from which a reply indicative of refusal of use is not received is set as a used bin, and the number "b" of empty mail bins is incremented by one (#409 to #412).

Figure 6:
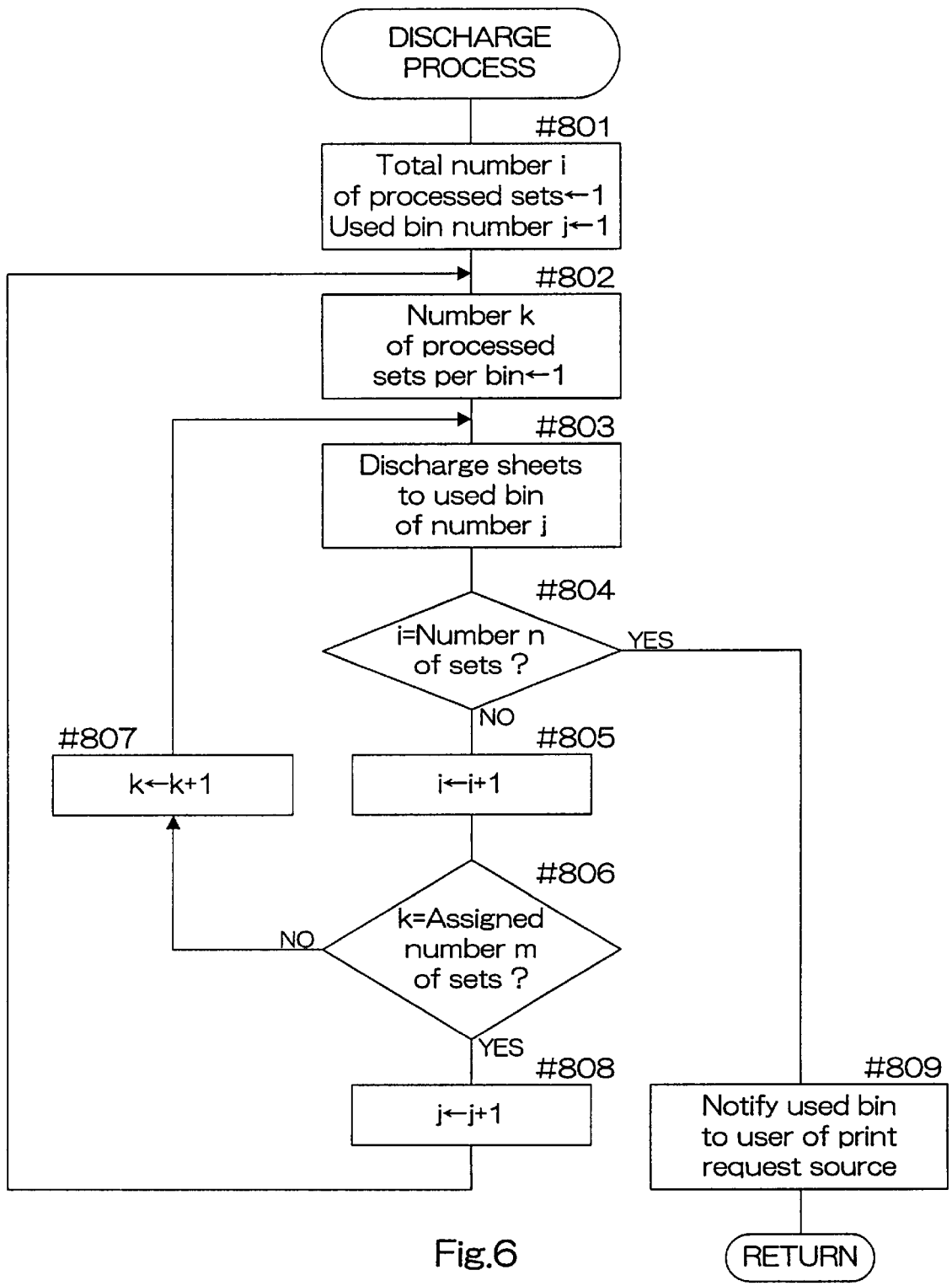
FIG. 6 is a flowchart of a subroutine of "discharge process".

FIG. 6 is a flowchart of a subroutine of "discharge process" which is executed in step #18 of FIG. 3.

First, a total number "i" of processed sets and the used bin number "j" which are parameters of a loop control are initialized to 1 (#801), and a number "k" of processed sets for each bin which is similarly a parameter is initialized to 1 (#802). Consecutive numbers are given to the bins which are set as used bins, in the above-mentioned order of priority. The used bin number "j" is a parameter for selecting a used bin in an alternative way.

Sheets are discharged to a bin of the used bin numbers "j" (#803). Each time when discharge of sheets of one set is ended, the total number "i" of processed sets is compared with the number "n" of sorted sets (#804). If the total number "i" of processed sets fails to reach the number "n" of sorted sets, the total number "i" of processed sets is incremented by one, and the number "k" of processed sets for each bin is compared with the assigned number "m" of sets (#805 and #806). If the number "k" of processed sets for each bin fails to reach the assigned number "m" of sets, the number "k" of processed sets for each bin is incremented by one (#807), and sheets are discharged to the bin of the same used bin number "j" as that of the previous process. If the number "k" of processed sets for each bin reaches the assigned number "m" of sets, the used bin number "j" is incremented by one to change the discharge destination (#808), the number "k" of processed sets for each bin is initialized, and sheets are discharged to the newly changed bin (#802 and #803). If the total number "i" of processed sets reaches the number "n" of sorted sets and the printing is completed, the used bins are notified to the user (computer) which is the print request source (#809). The operator of the computer checks the contents of the notification, and then performs the recovery work. As a result, printed articles can be rapidly recovered without causing an error, and the used bins including the mail bins for the other users can be made empty. If a recovery has not yet been performed even when a given time period (for example, 10 minutes) elapses after the end of the sort printing, a warning display which demands the user instructing the sort printing to recover the sheets may be performed. Alternatively, a message may be displayed which notifies the users to which the mail bins used in the sort printing are allocated that a recovery has not yet been performed, and which requests the users not to give instructions on a mail printing. The non-recovery may be notified to the network administrator to request a necessary counter measure.

In the embodiment, discharge to one bin is continued until the number of discharged sets reaches the assigned number "m" of sets. Alternatively, an operation of sequentially discharging one set to each used bin may be repeated until the number of processed sets reaches the number of sorted sets.

According to the embodiment, since the existence or nonexistence is judged by means of the sensor 50 and empty bins only are used in the sorting process, the number of sheets discharged to each bin can be surely suppressed to the accommodation limit or less, and hence it is possible to prevent a sheet jam from occurring.

In the above, the embodiment in which the invention is applied to a printing system using a printer has been described. The invention may be applied also to a facsimile system. In this case, the host requesting a printing is a facsimile transmitter and a facsimile receiver serves as the printing device of the invention.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A printing device connected with a plurality of external devices and for performing a mail printing in which printed sheets are discharged to designated specific bins or a sort printing in which printed sheets are sorted and discharged to a plurality of bins on the basis of print job data transmitted from the external devices, said printing device comprising:
   a plurality of bins to which printed sheets are discharged, a part of the plurality of bins being allocated as mail bins for the mail printing to specific ones of the plurality of external devices; and
   a controller which inquires of the specific ones of the plurality of external devices whether the mail bins are available or not when the sort printing is to be performed, and selects bins to be used in the sort printing on the basis of a reply to the inquiry.

2. A printing device as claimed in claim 1, further comprising a sensor which detects existence or nonexistence of a sheet in each of the plurality of bins, and wherein said controller detects, on the basis of a detection result of the sensor, bins of the plurality of bins to which a sheet is not discharged, and, when the number of bins which are not the mail bins and to which a sheet is not discharged is smaller than the number of sorted sets which is set in the sort printing, inquires whether the mail bins are available or not.

3. A printing device as claimed in claim 1, wherein said controller notifies an external device which requests the sort printing which bins which have been used in the sort printing.

4. A printing device as claimed in claim 1, wherein said controller, when there exists a sheet in a bin used in the sort printing at a timing when a given time period elapses after an end of the sort printing, notifies an external device which requests the sort printing and external devices to which the mail bins used in the sort printing are allocated.

5. A printing device connected with a plurality of external devices and for performing a mail printing in which printed sheets are discharged to designated specific bins or a sort printing in which printed sheets are sorted and discharged to a plurality of bins on the basis of print job data transmitted from the external devices, said printing device comprising:
   a plurality of bins to which printed sheets are discharged, a part of the plurality of bins being allocated as mail bins for the mail printing to specific ones of the plurality of external devices; and
   a controller which judges whether the mail bins are required to be used in the sort printing or not when the sort printing is to be performed, inquires of the specific ones of the plurality of external devices whether the mail bins are available or not when the mail bins are required to be used, and selects the mail bins as bins to be used in the sort printing when a negative reply to the inquiry is not received within a given time period.

6. A printing device as claimed in claim 5, further comprising a sensor which detects existence or nonexistence of a sheet in each of the plurality of bins, and wherein said controller detects, on the basis of a detection result of the sensor, bins of the plurality of bins to which a sheet is not discharged, and, when the number of bins which are not the mail bins and to which a sheet is not discharged is smaller than the number of sorted sets which is set in the sort printing, judges that the mail bins are necessary to be used in the sort printing.

7. A printing device as claimed in claim 6, wherein said controller judges whether the sort printing can be performed or not, on the basis of the number of bins which is a sum of the number of bins which are not the mail bins and to which a sheet is not discharged and the number of the mail bins that are selected as the bins to be used in the sort printing.

8. A printing device as claimed in claim 5, wherein said controller notifies an external device requests the sort printing which bins have been used in the sort printing.

9. A printing device as claimed in claim 5, wherein said controller, when there exists a sheet in a bin used in the sort printing at a timing when a given time period elapses after an end of the sort printing, notifies an external device which requests the sort printing and external devices to which the mail bins used in the sort printing are allocated.

10. A method of controlling bins to be used in a printing device connected with a plurality of external devices and for performing a mail printing in which printed sheets are discharged to designated specific bins or a sort printing in which printed sheets are sorted and discharged to a plurality of bins on the basis of print job data transmitted from the external devices, said method comprising the steps of:

1) when print job data requesting the sort printing is received from the external devices, judging whether ones of the plurality of bins being allocated as mail bins for the mail printing to specific ones of the plurality of external devices are required to be used in the sort printing or not;

2) when it is determined that the mail bins are required to be used in step 1, inquiring of the specific ones of the plurality of external devices whether the mail bins are available or not;

3) when a negative reply to the inquiry in step 2 is not received within a given time period, selecting the mail bins as bins to be used in the sort printing.

11. A method as claimed in claim 10, wherein in step 1, when the number of bins which are not the mail bins and to which a sheet is not discharged is smaller than the number of sorted sets which is set in the sort printing, it is judged that the mail bins are necessary to be used in the sort printing.

12. A method as claimed in claim 11, further comprising a step of judging whether the sort printing can be performed or not, on the basis of the number of bins which is a sum of the number of bins which are not the mail bins and to which a sheet is not discharged and the number of the mail bins that are selected as the bins to be used in the sort printing.

13. A method as claimed in claim 10, further comprising a step of notifying an external device which requests the sort printing which bins have been used in the sort printing.

14. A method as claimed in claim 10, further comprising a step of, when there exists a sheet in a bin used in the sort printing at a timing when a given time period elapses after an end of the sort printing, notifying an external device which requests the sort printing and external devices to which the mail bins used in the sort printing are allocated.

* * * * *

UNITED STATES PATENT AND TRADEMARK OFFICE
CERTIFICATE OF CORRECTION

PATENT NO. : 6,009,804
DATED : January 4, 2000
INVENTOR(S) : Masami Yamada

It is certified that error appears in the above-identified patent and that said Letters Patent is hereby corrected as shown below:

Cover page, [30], Foreign Application Priority Data, delete "9-230673", and insert --9-320673--.

Column 8, line 30 (claim 3, line 3), delete the second instance of "which".

Signed and Sealed this

Eighth Day of May, 2001

Attest:

NICHOLAS P. GODICI

Attesting Officer    Acting Director of the United States Patent and Trademark Office